United States Patent [19]
Kwon

[11] Patent Number: 5,210,615
[45] Date of Patent: May 11, 1993

[54] FRAME LINE INSERTING CIRCUIT FOR PRINTER

[75] Inventor: Sang-Chul Kwon, Suwon, Rep. of Korea

[73] Assignee: Samsung Electronics Co., Ltd., Suwon, Rep. of Korea

[21] Appl. No.: 684,204

[22] Filed: Apr. 12, 1991

[30] Foreign Application Priority Data

Apr. 16, 1990 [KR] Rep. of Korea .............. 5248/1990

[51] Int. Cl.⁵ .............................................. H04N 1/21
[52] U.S. Cl. ..................................... 358/296; 358/75; 346/76 PH
[58] Field of Search .................. 346/76 PH; 358/296, 358/75

[56] References Cited

U.S. PATENT DOCUMENTS 4,587,569  5/1986  Nakamura et al. ................. 358/296
4,974,069  11/1990  Shimomura .......................... 358/75

Primary Examiner—Benjamin R. Fuller
Assistant Examiner—Gerald E. Preston
Attorney, Agent, or Firm—Robert E. Bushnell

[57] ABSTRACT

A frame line inserting circuit in a printer for enabling the printing video data within a defined printing area of a printing paper, and enabling the printing of frame lines at selected horizontal and vertical boundaries of the printing paper where no video data is found. The circuit of the present invention includes: an A/D converter for converting the received analog video data signals to digital video data by pixel unit; a color ROM capable of storing at least one or more color data, for generating color data for printing frame lines by an external selection; a first counter set to a vertical count value serving as the vertical frame line inserting period, for counting column pixels and generating a first logic signal at the vertical count value; a second counter set to a horizontal count value serving as the horizontal frame line inserting period, for counting a row pixels and generating a first logic signal at the horizontal count value; a gate for multiplying the outputs of the first and second counters logically, and for generating a first logic signal when the first counter or/and second counter output; and a switch with common terminal connected to the line memory.

11 Claims, 3 Drawing Sheets

FRAME LINE INSERTING CIRCUIT FOR PRINTER

BACKGROUND OF THE INVENTION

The present invention relates to a printer, and particularly to a frame line inserting circuit for inserting a frame line around the printing area during printing in a printer.

Generally, a video color printer is an apparatus for receiving and printing color video signals. FIG. 1 illustrates an example of a structure of such a conventional video color printer. Referring to this drawing, an A/D converter 1 converts the received analog video signals to digital video signals. A line memory 2 stores the output digital video data from the A/D converter 1, as the unit of the line. Further, a gradation read only memory (ROM) 3 stores temperature compensating data corresponding to the status of emitting heat of a TPH (thermal print head) 6. A comparator 4 which receives the video data of the line memory 2 and the compensated data of the gradation ROM 3 compares the two data so as to compensate the density of the received video data. Consequently, the TPH 6 can perform printing at a constant density regardless of the status of the emitting heat. Under this condition, if the TPH 6 has two arrays, a dividing circuit 5 performs such a function that the video data for the respective lines are divided in such a manner as to be applied to the respective arrays of the TPH 6. If the TPH 6 has a single array, the dividing circuit 5 is not used. However, the printing method as described above is capable of printing only the video signals, and therefore, there is the disadvantage that the boundary of the print is not definite. That is, the boundary status between the printing area and the non-printing area becomes not neat.

SUMMARY OF THE INVENTION

It is an object of the present invention to provide a frame line inserting circuit by which the boundary status between the printing area and the non-printing area become neat by inserting frame lines during printing.

It is another object of the present invention to provide a frame line inserting circuit in which, even for the area where there is no video data, a frame line can be inserted by utilizing the horizontal and vertical synchronizing signals.

According to one aspect of the present invention, there is provided a frame line inserting circuit in a printer including first counter, second counter, gating device, analog-to-digital converter, memory device, and switching device. The constitution of the circuit to achieving the above objects, including: first counter coupled with column pixels for counting a number of vertical synchronization signals of the video signal to produce therefrom a first logic signal, the number of vertical synchronization signals being corresponding to a period for inserting a vertical frame-line; second counter coupled with row pixels, for counting a number of horizontal synchronization signals of the video signal to produce therefrom a second logic signal, the number of horizontal synchronization signals corresponding to a period for inserting a horizontal frame-line; gating device coupled to the first and second counters for producing a third logic signal from a combination of the first and second logic signals; analog-to-digital converter for converting the analog input video data to digital data; memory device having at least one data set prepared to designate each color for use in the frame-line upon printing the video data in the printer; and switching device coupled to the line memory, for selecting an input to the line memory under control of the third logic signal, the input corresponding to either, one of the digital from the analog-to-digital converter or at least one data set from the memory device.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
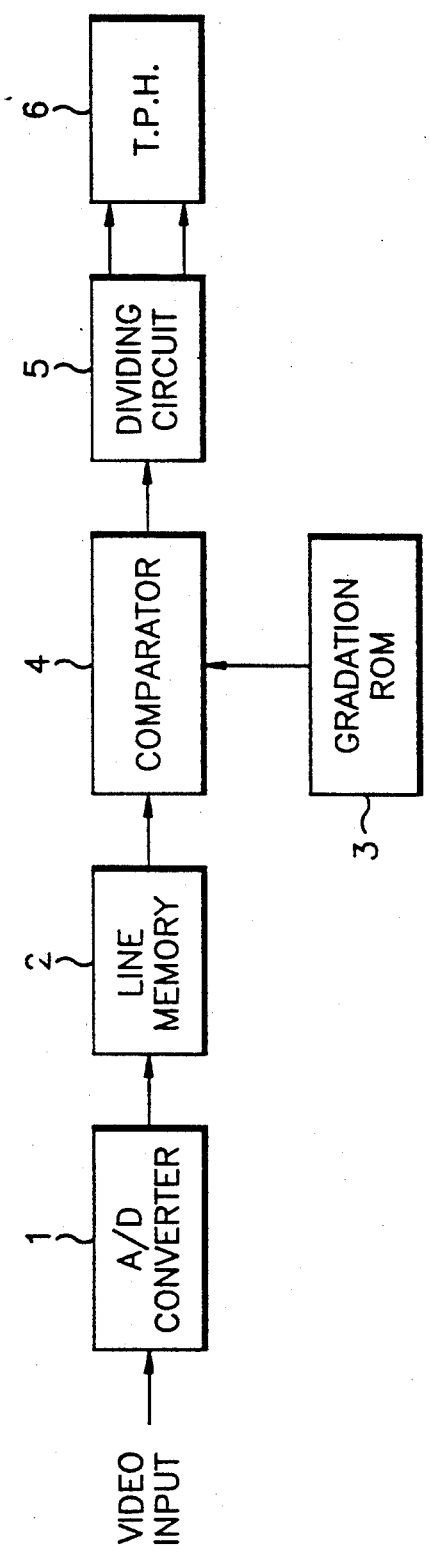
FIG. 1 is a block diagram showing the construction of the conventional printer.
Figure 2:
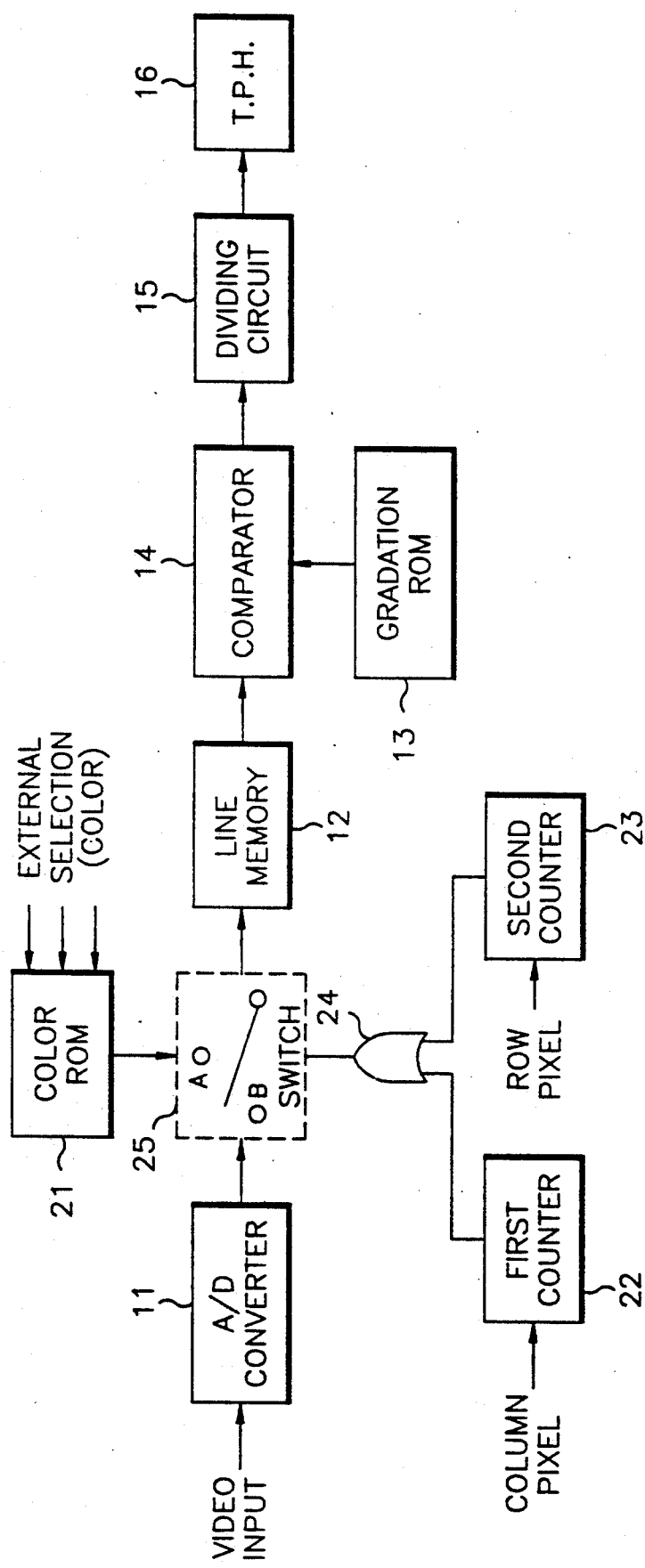
FIG. 2 is a block diagram showing the construction of the printer according to the present invention.

FIG. 2 illustrates the printer according to the present invention, which is capable of inserting a frame line between the printed area and non-printed area. The constitution of the printer of the present invention will be described referring to FIG. 2. A first counter 22 is set to a count value for inserting a frame line to a vertical segment where there is no video data. Thus the first counter 22 counts the column pixels, and generates a first logic signal for inserting the vertical frame line at the counted value. A second counter 23 is set to a count value for inserting a frame line to a horizontal segment where there is no video data. Thus the second counter 23 counts the row pixels, and generates a second logic signal for inserting the horizontal frame line at the counted value. A gate 24 multiplies the outputs of the first and second counters 22, 23 logically, and generates a switching signal for inserting a frame line each time when the first logic signal is generated. A color ROM 21 stores at least one or more color data and outputs the color data as the frame line data by external selection. An A/D converter 11 converts the received analog video signals to digital video data by pixel unit. A switch is connected to the color ROM 21 through its first terminal A, and also connected to the A/D converter 11 through its second terminal B. When the gate 24 outputs a third logic signal, the switch 25 is switched to the first terminal A to output the data of the color ROM 21, and, when a second logic signal is generated, the switch 25 is switched to the second terminal B to output the data of the A/D converter 21. A line memory 12 stores the received data through of the switch 25 by lines. A gradation ROM 13 stores a temperature compensating data for a status of emitting heat of TPH 16, and outputs temperature compensating data for the relevant temperature after detecting the status of the emitting of heat of the TPH 16. A comparator 14 compensates the concentration of the video data by comparing the output data of the line memory 12 and the compensating data of the gradation ROM 13. A dividing circuit 15 divides the video generated by the comparator 14 so that the data can be supplied to the respective arrays of the TPH 16. Then the TPH 16 prints the video data outputted from the dividing circuit 15. As described above, in the case where the TPH 16 has a single array, the dividing circuit 15 is not used.

Figure 3:
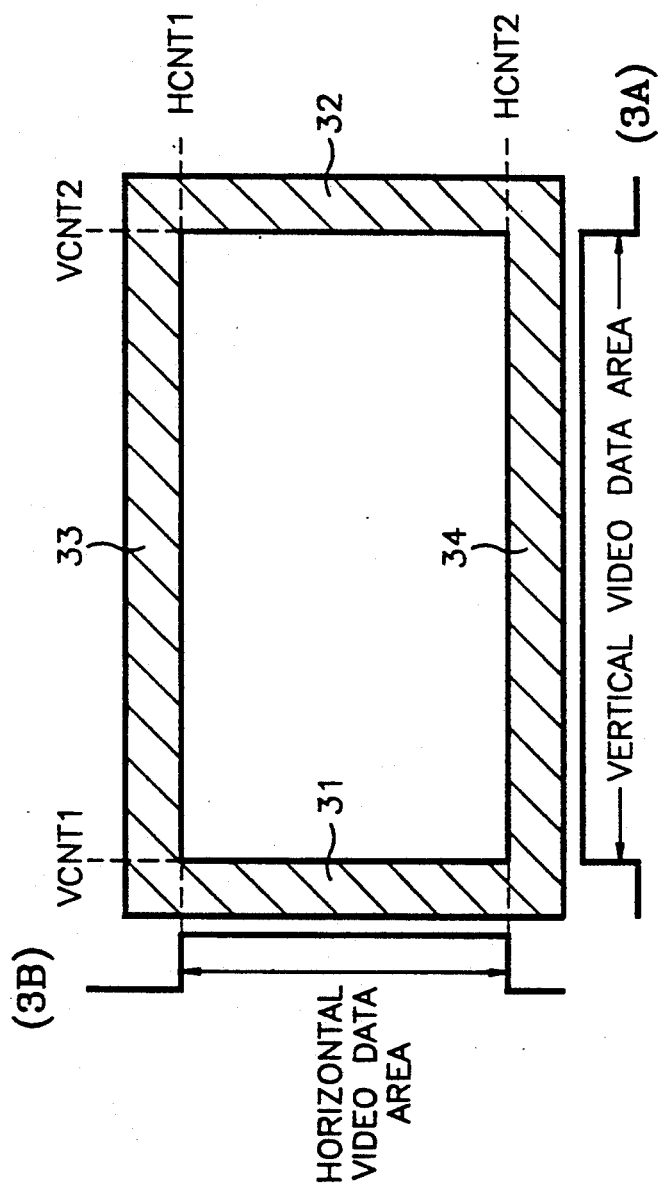
FIG. 3 illustrates an example of inserting an frame line by utilizing the horizontal and vertical synchronizing signals.

FIG. 3 illustrates an example of the frame line printed onto the paper, and here, the vertical section between VCNT1 and VCNT2, and the horizontal section between HCNT1 and HCNT2 are respectively determined by the count values set to the first and second counters 22, 23.

Referring to FIG. 2, the inserting sections of the frame lines are determined by setting count values to the first and second counters 22, 23. Here, the first counter 22 counts the column pixels, and therefore, the frame line of vertical section is determined by the first counter 22. Therefore, the first vertical counting value VCNT1 of the first counter 22 is set that a first vertical frame line 31 should by located at a proper place between the non-video data area and the starting area of video data.

The second vertical counting value VCNT2 of the first counter 22 is set in such a manner that, following the above segment, a second vertical frame line 32 should be located at a proper place between the ending area of video data and the non- video data area. Thus, the first vertical counting value VCNT1 of the first counter 22 is set to the segment between the non- video data area and the starting area of video data, while the second vertical counting value VCNT2 of the first counter 22 is set to the segment between the ending area of video data and the non-video data area. Under this condition, in constituting the first counter 22, if the counter 22 has a count value corresponding to between the first vertical counting value VCNT1 and the second vertical counting value VCNT2, it is let to have a second logic signal of a high state, while, if it has other count values, it is let to have a first logic signal of a low state.

First and second horizontal counting values HCNT1, HCNT2 of the second counter 23 are determined in the same manner. Thus, the second counter 23 counts the row pixels, so that first and second horizontal frame lines 33, 34 should be printed on the paper in accordance with the first and second horizontal counting values HCNT1, HCNT2. If the vertical counting values VCNT1, VCNT2 and the horizontal counting values HCNT1, HCNT2 of the first and second counters 22, 23 are determined in the above described manner, the inserting positions of the vertical frame lines 31, 32 and the horizontal frame lines 33, 34 are determined as shown in FIG. 3. First if the first counter 22 or/and second counters 23 output first logic signals of a low state, the gate 24 which multiplies the outputs of the first or/and second counters 22, 23 logically generates a first logic signal of a low state. Accordingly, the switch 25 is switched to the first terminal A, so that the output of the color ROM 21 should be supplied to the line memory 12. Here the color ROM 21 stores the color data for printing the frame lines in accordance with the external selection. Therefore, the color data which is output from the color ROM 21 for the frame line inserting segments are supplied through the switch 25 to the line memory 12. Thereafter, the color data which is outputted from the line memory 12 is compared with the output of the gradation ROM 13 by the comparator 14.

Meanwhile the video data which is output from the comparator 14 is divided by the dividing circuit 16 being supplied to the respective arrays of the TPH 16. Accordingly, the color data selected by the user is printed to the vertical or horizontal frame line section of the paper, and under this condition, the frame line printing is carried out on the outer frames of the paper where there is video data.

In the case where the outputs of the first and second counters 22, 23 are not in the first logic state of a low state, the output of the gate 24 comes to have the second logic state, and this corresponds to the video data existing area. The switch 25 is switched to the second terminal B by the second logic signal output of the gate 24, so that output of the A/D converter 11 should be connected to the line memory 12. Therefore, the video data of pixel unit which is outputted from the A/D converter 11 is stored in the line memory 12, and this video data is ultimately supplied to the TPH 16 which prints the video data on the paper correspondingly with the state of the video data.

Referring to FIG. 3, first, the number of the vestial synchronizing pulses is counted to calculate the first and second vertical counting values VCNT1, VCNT2 as shown in FIG. 3, and then, the number of the horizontal synchronizing pulses is counted to calculate the first and second horizontal counting values HCNT1, HCNT2. Thereafter, the first and second vertical counting values VCNT1, VCNT2 are set to the first counter 22. And then the first counter 22 counts a number of the column pixel of received digital video data and generates the first logic signal of low- state by the first and second vertical counting values VCNT1, VCNT2. In the preceding process, the first counter 22 can consist of a third counter (not shown) which generates a third logic signal according to the first vertical counting value VCNT1, a fourth counter (not shown) which generates a fourth logic signal according to the second counting value VCNT2 and a circuit which generates the first logic signal by adding the first and second counting values VCNT1, VCNT2. If the first and second horizontal counting values HCNT1, HCNT2 are set in the second counter 23, the second counter 23 generates the first logic signal of low-state, such as (3B) of FIG. 3. In the preceding process, a composition of the second counter 23 and the composition of the first counter 22 is the same way.

Here, the size of the printing area and the size of the paper are different from each other, and therefore, the video data does not occupy the whole area of the paper. Further, the width of the frame lines 31 through 34 is defined by a predetermined number of the column and row pixels, and therefore, the outputs of the first and second counters 22, 23 have only to be kept to a low state through as long time as the predetermined number of the pixels occurring through the video data printing sections. Therefore, the frame lines 31-34 are printed by the output of the color ROM 21 during the time when the first and second counters 22, 23 output the first logic signals, while the video data are printed during the time when the first and second counter 22 or 23 outputs the second logic signals.

According to the present invention as described above, the video color printer which prints each line of video data is capable of inserting frame lines along the boundaries of the video data printing, with the result that the boundary of the print becomes more neat and definite.

What is claimed is:

1. A frame line insertion circuit in a printer having a line memory for storing input video data line by line, for printing the line video data, comprising:

first counter means coupled to receive column pixels for counting a number of vertical synchronization signals of said video signal to produce therefrom a first logic signal, said number of vertical synchronization signals corresponding to a period for inserting a vertical frame-line;

second counter means coupled to receive row pixels, for counting a number of horizontal synchronization signals of said video signal to produce therefrom a second logic signal, said number of horizontal synchronization signals corresponding to a period for inserting a horizontal frame-line;

gating means coupled to said first and second counter means for producing a third logic signal from a combination of said first and second logic signals;

analog-to-digital converter means for converting digital data;

memory means having at least one data set prepared to designate selected color for use in said vertical and horizontal frame-lines upon printing said digital video data in a printer; and switching means coupled to a line memory, for selecting an input to said line memory under control of said third logic signal, said input corresponding to either one of the digital video data from said analog-to-digital converter means or at lest one data set from said memory means.

2. A frame line insertion circuit, comprising:

counter means coupled to receive column pixels and row pixels of an input video signal, for counting a number of vertical synchronization signals of video signals to produce therefrom a first logic signal, said number of vertical synchronization signals corresponding to a period for inserting a vertical frame-line, and for counting a number of horizontal synchronization signals of said video signals to produce therefrom a second logic signal, said number of horizontal synchronization signals corresponding to a period for inserting a horizontal frame-line;

gating means coupled to said counter means for producing a third logic signal from a combination of said first and second logic signals;

memory means having at least one data set prepared to designate selected color for use in said vertical and horizontal frame-lines upon printing said video signals in the printer; and switching means coupled to receive said video signals line-by-line, for selecting an input under control of said third logic signal to a line memory, said input corresponding to either one of the input video signal or said at least one data set from said memory means.

3. A frame line insertion circuit, comprising:

counter means coupled to receive column pixels and row pixels of an input video signal, for counting numbers of horizontal and vertical synchronization signals of said video signal to produce horizontal and vertical frame-line signals indicative of selected horizontal and vertical printing starting points and ending points on a printable medium, based upon numbers of said column pixels and row pixels per frame;

memory means having data indicative of a selected color component for use in printing said vertical and horizontal frame-line signals; and means coupled to receive said input video signal line-by-line for printing said video signal within said selected horizontal and vertical printing starting points and ending points on said printable medium, and receiving said data indicative of said selected color component for printing said horizontal and vertical frame-line signals at said horizontal and vertical starting points and ending points of said printable medium.

4. A frame line insertion circuit for a printer having a line memory for temporarily storing video signals on a line-by-line basis, comprising:

first counter means coupled to receive first clock signals of said video signals and counting a number of pixels per column line of said video signal to determine vertical framelines representative of vertical boundaries separating a vertical printable area from first and second vertical non-printable areas within a printable medium, said vertical frame-lines corresponding to a first period for inserting said vertical frame-lines at said vertical boundaries;

second counter means coupled to receive second clock signals of said video signals and determining horizontal frame-lines representative of horizontal boundaries separating a horizontal printable area from first and second horizontal non-printable areas within said printable medium, said horizontal frame-lines corresponding to a second period for inserting said horizontal frame-lines within said horizontal boundaries; and switching means for responding to said vertical and horizontal frame-lines by enabling transmission of selectable color data to said line memory during said first and second periods for inserting said vertical and horizontal frame-lines representative of said vertical and horizontal boundaries of said printable medium, said vertical and horizontal boundaries forming a window within said printable medium separating a printable area from a non-printable area, said window having a third period representative of said printable area, said switch means enabling transmission of said input video signals to said line memory during said third period representative of said printable area.

5. The frame line insertion circuit as claimed in claim 4, further comprising gate means for receiving said vertical and horizontal frame-lines to produce a control signal for controlling said switch means.

6. The frame line insertion circuit as claimed in claim 4, further comprising memory means for storing a plurality of color data to be selected by a user to provide said selectable color data to said line memory.

7. The frame line insertion circuit as claimed in claim 4, wherein said selectable color data is used in accordance with said vertical and horizontal frame-lines for printing said selectable color data at said vertical and horizontal boundaries separating said printable area from non-printable areas within said printable medium.

8. The frame line insertion circuit as claimed in claim 4, wherein said first clock signals are pixel clock signals of said video signal, and said second clock signals are horizontal synchronizing signals.

9. The frame line insertion circuit as claimed in claim 6, wherein said selectable color data is used in accordance with said vertical and horizontal frame-lines for printing said selectable color data at said vertical and horizontal boundaries separating said printable area from non-printable areas within said printable medium.

10. The frame line insertion circuit as claimed in claim 6, wherein said first clock signals are pixel clock signals of said video signal, and said second clock signals are horizontal synchronizing signals.

11. The frame line insertion circuit as claimed in claim 5, wherein said first clock signals are pixel clock signals of said video signal, and said second clock signals are horizontal synchronizing signals.

* * * * *